United States Patent
Allison et al.

(10) Patent No.: US 10,037,266 B2
(45) Date of Patent: Jul. 31, 2018

(54) GAME STREAM FUZZ TESTING AND AUTOMATION

(71) Applicant: Sony Interactive Entertainment America LLC

(72) Inventors: Tylor Allison, San Mateo, CA (US); Geoffrey Poer, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 84 days.

(21) Appl. No.: 15/088,624

(22) Filed: Apr. 1, 2016

(65) Prior Publication Data

US 2017/0286279 A1    Oct. 5, 2017

(51) Int. Cl.
G06F 11/00    (2006.01)
G06F 11/36    (2006.01)
H04L 29/06    (2006.01)
A63F 13/352   (2014.01)

(52) U.S. Cl.
CPC ........ *G06F 11/3688* (2013.01); *A63F 13/352* (2014.09); *H04L 65/60* (2013.01)

(58) Field of Classification Search
CPC .............................................. G06F 11/3688
USPC ...................... 714/38.14, 38.13, 38.1, 39, 37
See application file for complete search history.

(56) References Cited

U.S. PATENT DOCUMENTS

| | | | | |
|---|---|---|---|---|
| 5,687,376 A | * | 11/1997 | Celi, Jr. .............. | G06F 11/3466 710/15 |
| 7,035,770 B2 | * | 4/2006 | Lin ..................... | G05B 23/0281 702/182 |
| 7,926,114 B2 | * | 4/2011 | Neystadt ............. | G06F 11/3672 726/22 |
| 9,767,005 B2 | * | 9/2017 | Eddington .......... | G06F 11/3624 |
| 2014/0279762 A1 | * | 9/2014 | Xaypanya ............... | G06N 3/08 706/12 |

* cited by examiner

*Primary Examiner* — Dieu-Minh Le
(74) *Attorney, Agent, or Firm* — Martine Penilla Group, LLP

(57) ABSTRACT

A system and method of fuzz testing an on-line gaming system includes a host test bench system capable of generating a protocol template that can be used for identifying primitives in the data communications between a client device and the online gaming servers. The protocol template can then be used to identify primitives in initial communications between the client device and the online gaming servers and perform generation fuzz testing of those initial communications. The system also includes a game stream interceptor that can intercept streaming online gaming data in both directions between the client device and the online gaming system. The intercepted streaming online gaming data can be mutated to test the client device and the servers in the online gaming system.

12 Claims, 6 Drawing Sheets

GAME STREAM FUZZ TESTING AND AUTOMATION

FIELD OF THE DISCLOSURE

The present disclosure relates generally to on-line gaming host systems, and more particularly, to methods and systems for testing on-line gaming host systems.

BACKGROUND

On-line gaming is hosted and administered by one or more hosting servers that are accessed by a user through the user's client device. The user's client device is coupled to the one or more hosting servers by one or more local networks and Internet connections. The on-line gaming requires accurate, timely communication between the hosting servers and the user's client device to provide an immediate, uninterrupted user experience. By way of example, the game session can be interrupted or delayed with a "buffering" state if the communication between one or more of the hosting servers or between one of the hosting servers and the user's client device is delayed or interrupted. During the buffering state, the operations of the game may be paused and the user experience typically suffers severely. The buffering can be caused by errors in communication or lost data due to interruptions in the networks and Internet that couple the hosting servers and the user's client device. Such buffering and communication errors can be avoided through testing the operations and responses of the hosting servers and the user's client device. Unfortunately, robust testing is time consuming and can be difficult.

It is in this context that the following embodiments arise.

SUMMARY

Broadly speaking, the present disclosure fills these needs by providing systems and methods of fuzz testing on-line gaming systems. It should be appreciated that the present disclosure can be implemented in numerous ways, including as a process, an apparatus, a system, computer readable media, or a device. Several inventive embodiments of the present disclosure are described below.

One implementation includes a system for fuzz testing an on-line gaming system includes a host test bench system capable of generating a protocol template that can be used for identifying primitives in the data communications between a client device and the online gaming servers. The protocol template can then be used to identify primitives in initial communications between the client device and the online gaming servers and perform generation fuzz testing of those initial communications. The system also includes a game stream interceptor that can intercept streaming online gaming data in both directions between the client device and the online gaming system. The intercepted streaming online gaming data can be mutated to test the client device and the servers in the online gaming system Other implementations include methods for testing an on-line gaming system including methods for automatically generating a protocol template. Also included are methods for generation fuzz testing initial communications between a client device and the servers of the on-line gaming system. The generation fuzz testing of the initial communications between the client device and the servers of the online gaming system utilizes the protocol template to identify primitives in the initial communications that can be tested.

In addition, a mutation fuzz testing method can be applied to streaming data exchanges between the client device and the servers of the on-line gaming system. The mutation fuzz testing utilizes a game stream interceptor acting as a proxy for receiving the streaming data from each of the client device and the servers of the online gaming system and also forwarding mutated versions of the received streaming data to the respective intended receiver of the received streaming data.

The generation fuzz testing in the mutation fuzz testing captures failure reports that can then be analyzed for root causes of the failures and thus identify vulnerabilities in the software and hardware components of the on-line gaming system.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several exemplary embodiments for fuzz testing an on-line gaming system will now be described. It will be apparent to those skilled in the art that the present disclosure may be practiced without some or all of the specific details set forth herein.

Fuzz testing is a testing methodology used to find potential vulnerabilities, malfunctions and errors in software and hardware components. In general, fuzz testing provides substantially random inputs or data to the servers and/or client devices being tested. The substantially random inputs and/or data test the responses of the servers and/or client devices to find error conditions not properly handled by the servers and/or client devices. Improper responses can identify actual and potential failures or vulnerabilities to the servers and/or client devices.

Fuzz testing implementations generally fall into two categories: generation based fuzz testing and mutation based fuzz testing. Generation based fuzz testing generates new data to send to the servers and/or client devices. Mutation based fuzz testing captures and modifies an existing data flow between the servers and/or client devices.

Determining which bytes to modify and/or generate also falls into two categories: random fuzz testing and protocol based fuzz testing. Random fuzz testing chooses the byte or bytes of data to add, modify or delete at random locations in the data stream. Protocol based fuzz testing includes knowledge of the underlying protocol and application programming interface (API) being tested and generates data based on the structure of the protocol and API.

Automating fuzz testing makes the process easier to deploy and maintain. This automation includes automation of protocol decoding, a network protocol interceptor and an automation framework. The automation of protocol decoding identifies fuzz testing primitives to act as templates for generation based fuzz testing. Automatically identified fuzz testing primitives replaces a prior art, time consuming, manual process.

The automation framework drives both generation and mutation based fuzz testing. The network protocol interceptor is capable of on the fly decoding and fuzz testing. The network protocol interceptor is included in a network intercept module added to the fuzz testing system.

Figure 1:
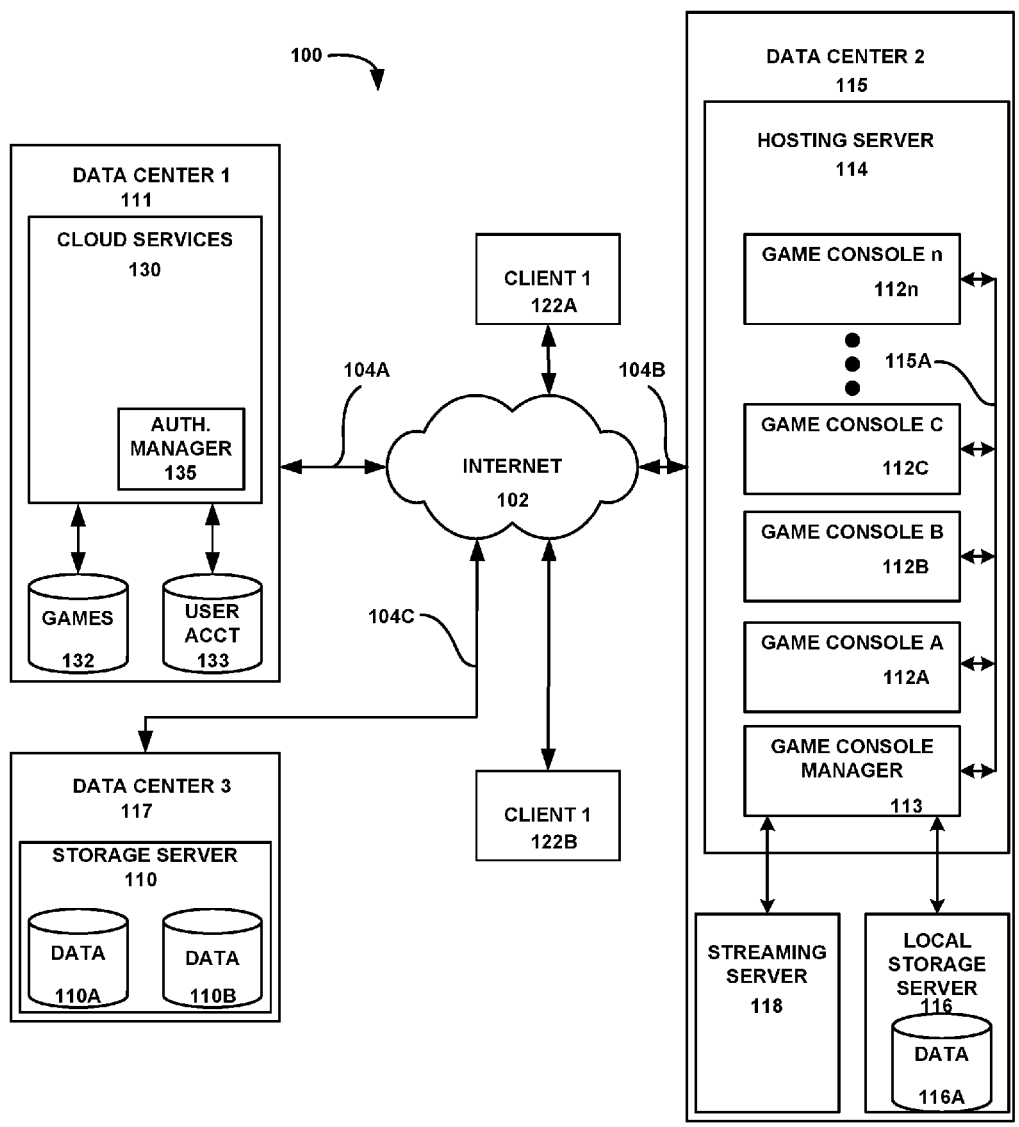
FIG. 1 is a simplified cloud gaming system, for implementing embodiments of the present disclosure.

FIG. 1 is a simplified cloud gaming system 100, for implementing embodiments of the present disclosure. The cloud gaming system 100 includes one or more servers providing cloud services 130, one or more hosting servers 114 for hosting the on-line gaming session, a streaming server 118 for streaming gaming content to the client devices 122A, 122B and a storage server 110 for storing on-line gaming data. The hosting servers 114 include multiple game consoles 112A-n and one or more game console managers 113.

The cloud services 130, the hosting servers 114, the streaming server 118 and the storage server 110 can be located in one or more data centers 111, 115, 117. The cloud services 130, the multiple game consoles 112A-n, the streaming server 118 and the storage server 110 are coupled together by local area networks 104A, 104B, 104C and/or the Internet 102 and combinations thereof. The multiple game consoles 112A-n and the game console manager 113 can be co-located in a single data center 115 or distributed among more than one data centers. The multiple game consoles 112A-n can be virtual game consoles that are instantiated, as needed, by the one or more game console managers 113 and hosted one or more of the hosting servers 114.

The game console manager 113 manages one or more game consoles 112A-n depending on one or more hardware and/or software architectures. The game console manager 113 is connected to the game consoles 112A-n using a network connection 115A and/or an optional general purpose input/output, a universal serial bus or an equivalent control connection for activating power to a game console. The game console manager 113 can optionally include additional roles such as setting up and managing a streaming session between an assigned game console, the streaming server 118 and the user's client device 122A, 122B.

A local storage server 116 could optionally be co-located in the same data center 115 with one or more of the multiple game consoles 112A-n. The local storage server 116 can store on-line gaming data 116A to be used by or received from the multiple game consoles 112A-n and/or the cloud services 130 and/or the streaming server 118. The data centers 111, 115, 117 can be separated geographically. By way of example, the first data center 111 and the third data center 117 can be located in Los Angeles, Calif. and the second data center 115 can be located in Stockholm, Sweden.

The cloud services 130 and/or the game console manager 113 can include a games database 132 for storing multiple gaming applications and other applications that may be downloaded to one of more of the multiple game consoles 112A-n. The cloud services 130 also include an authorization manager 135. The authorization manager 135 determines if a first user has a valid account and the authorized access to the cloud gaming system 100. A first user's account information is included in a user account database 133. The authorization manager 135 access the user account database 133 to retrieve and store user account data as needed to determine a current account status and authorization of a given user.

The storage server 110 provides storage facilities for the cloud gaming system 100. The storage server 110 includes one or more storage devices 110A, 110B for storing gaming data, as may be required by the cloud gaming system 100. The one or more storage devices 110A, 110B can be any suitable storage media, e.g., hard disk drive, solid state drive, or optical drive, etc.

The streaming server 118 provides streaming data, typically audio and video data, to the client devices 122A, 122B. The streaming video and audio data are output from one or more game consoles 112A-n and received in the streaming server 118. The streaming server 118 encodes the received streaming video and/or audio data and outputs the encoded streaming video and/or audio data to the client devices 122A, 122B. Corresponding decoders in the client devices 122A, 122B decode the encoded streaming video and/or audio data for presentation on respective display devices and audio output devices coupled to the respective client devices.

The encoding performed by the streaming server 118 can vary with the available bandwidth, quality requirements, capabilities of the client devices 122A, 122B and many other aspects. The streaming server 118 can be included in the same or different data centers as the multiple game consoles 112A-n.

The client devices 122A, 122B provide users with access to the cloud gaming system 100 via the Internet 102 and/or a local network 104A-C. The client devices 122A, 122B can be any suitable platform capable of accessing the Internet 102 and/or a local network 104A-C. By way of example, the client devices 122A, 122B can be a personal computer, laptop computer, a notebook computer, a handheld gaming device, a handheld computing device such as a tablet computer or a smart telephone or any other suitable computing platform. The first client computing device 122A and the second client computing device 122B can be used in multiple different, geographically disparate locations.

By way of example, the first client computing device 122A can be a tablet computer used to access the Internet 102 and the cloud gaming system 100 by the first user at his home, in his office and while he is travelling. Similarly, the second client computing device 122B can be a notebook computer capable of accessing the Internet 102 and the cloud gaming system 100 in a home, in an office or other locations having Internet access.

The cloud gaming system 100 includes many different components that are coupled by multiple networks and other data connections, as described above. Each of these components and the data connections that coupled them together provide opportunities for miscommunication and errors that would reduce the overall performance of the cloud gaming system 100 and thereby degrade the on-line gaming user experience. Testing the cloud gaming system 100 provides a better performing system in a much more satisfying user experience. There many types of testing that can be applied to the cloud gaming system 100.

The fuzz testing of the cloud gaming system 100, as described herein, tests the data communications between the client devices 122A, 122B, the cloud services 130 and the streaming server 118. In one implementation, testing the data communications between the client devices 122A, 122B, cloud services 130 and the streaming server 118 includes simulating the client devices, as described in more detail as follows.

Figure 2:
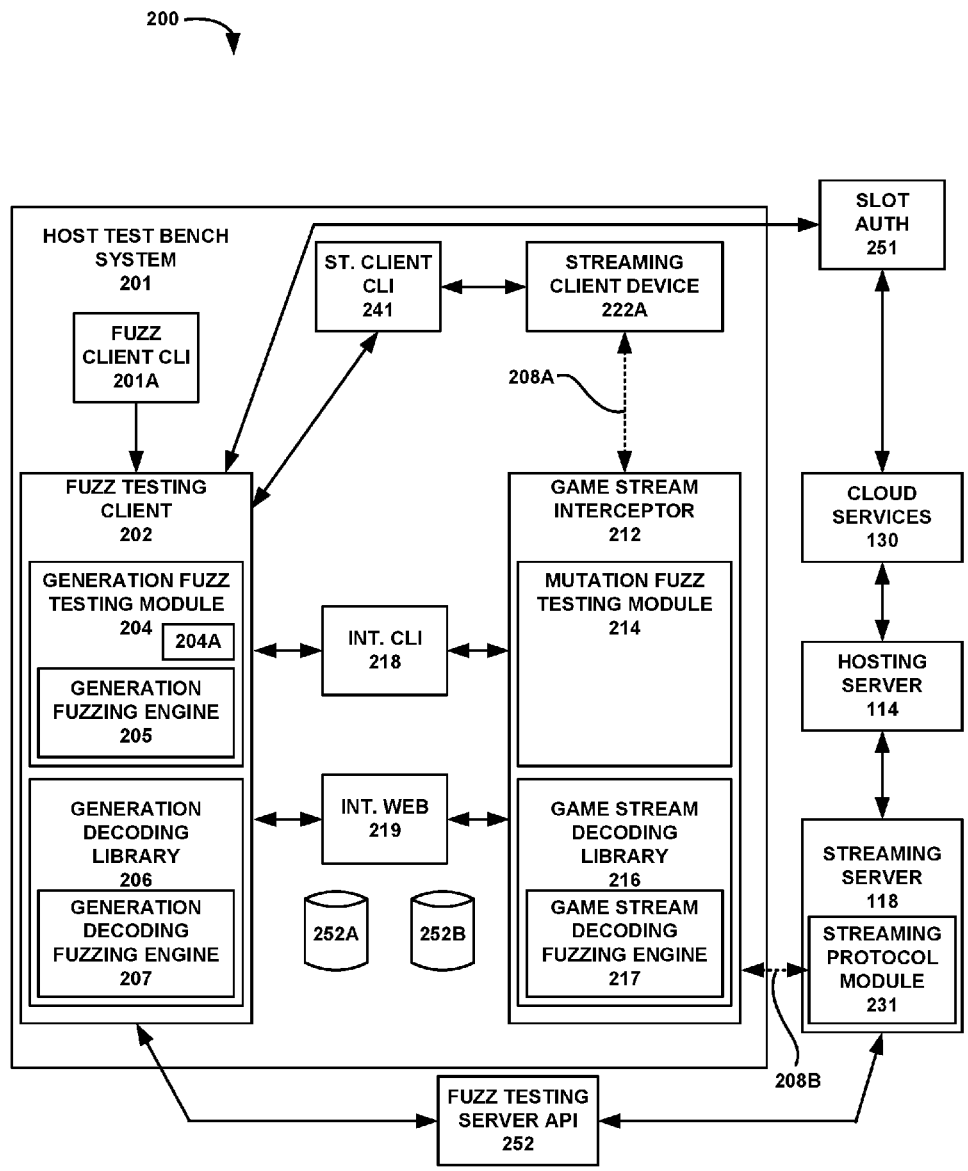
FIG. 2 is a simplified block diagram of a fuzz testing system, for implementing embodiments of the present disclosure.

FIG. 2 is a simplified block diagram of a fuzz testing system 200, for implementing embodiments of the present disclosure. The fuzz testing system 200 includes a fuzz testing client 202, a game stream interceptor 212 and a streaming client device 222A. The fuzz testing client 202, game stream interceptor 212 and the streaming client device 222A are included in a host test bench system 201. The host test bench system 201 can be any suitable computing platform. In one implementation the host test bench system 201 is a Linux based system, however it should be understood that the Linux based system is merely an exemplary implementation provided for purposes of discussion and description of the embodiments of the present disclosure. In one implementation, the fuzz testing client 202 can be instantiated via a fuzz testing client API 201A.

The fuzz testing client 202 can be used to start the streaming client device 222A, getting authorization codes for the streaming session from the cloud services 130, instantiating the game stream interceptor 212, as well as running the generation fuzz testing module 204, depending on the test requirements.

During the fuzz testing, a virtualized streaming client device 222A can be used to interface with the streaming servers 118 and the cloud services 130 to automate the on-line game streaming process. The cloud services 130 provide the administrative operations and management of the streaming servers 118 including user authorization, hosting and streaming server assignment for a given client device. The cloud services 130 can also provide monitoring of the operations of the on-line gaming system.

The streaming client device 222A is coupled to the game stream interceptor 212 by a data communication network 208A. The game stream interceptor 212 is coupled to the streaming server 118 by a data communication network 208B. One or more of the data communication networks 208A, 208B can include multiple networks including the Internet.

The fuzz testing client 202 provides a user interface for operating the fuzz testing system 200. The fuzz testing client interfaces with cloud services 130 and the streaming servers 118 to acquire proper on-line gaming user credentials and a server lock before starting a generation fuzz test. For mutation testing, the fuzz testing client 202 initiates the streaming client device 222A and interfaces with the game stream interceptor 212 to set up each mutation fuzz testing case. The cloud services 130 provides user central account management for the on-line gaming system. Users register an account to uniquely identify themselves to the on-line gaming system. In one implementation, the user account is used to track whether or not an account is active and for each account, what games that user is allowed to play. The user's on-line gaming credentials identify the user and what games the user is authorized to play. In one implementation, after the user is authorized by verifying the user's credentials correspond to a valid user account, the user can selected a game that they wish to play. The cloud services 130 then determine if the user is allowed to the selected game. Next, the cloud services 130 confirms the corresponding user account is not already streaming a game other than the selected game. If there is no other game currently streaming to the user account, the cloud services also identifies a streaming server that is available to play the selected game. The cloud services 130 then performs a server lock to assign the identified streaming server to the selected game and the user account. The server lock synchronizes between when the cloud services 130 authorization of the streaming session and when the client device actually starts the streaming session with the streaming server.

The cloud services 130 provide authorization tokens that are used to begin a new streaming session. The streaming client device 222A is the client device of the on-line game streaming protocol and one of the components being tested by the fuzz testing. The streaming server 118 streams audio and/or video content of the on-line gaming session. The streaming server 118 is also tested by the fuzz testing system 200.

Generation based fuzz testing uses a high level of overhead in order to generate a protocol template 204A. A generation fuzzing engine 205 uses the protocol template 204A to generate test data that is modified from what is expected under normal operations. This modified test data is referred to as a generation fuzzed input. The generation fuzzed input is then applied to the on-line gaming system under test (e.g., the cloud services 130, hosting server 114 and streaming server 118).

Typically, the protocol template 204A is manually generated, such as by the operator of the host test bench system 201 by manually analyzing the network protocol being tested and manually identifying all of the individual building blocks of the network protocol as separate fuzzing primitives e.g., strings, integers, booleans, etc., and groupings thereof. When the network protocol changes, the operator of the host test bench system 201 typically, manually recreates a new protocol template or templates 204A. Implementations described herein automate the creation of the protocol templates 204A when the network protocol changes.

A generation decoding library 206 is provided by the code developer. The generation decoding library 206 describes the network protocol in terms of fuzz testing primitives. The generation decoding library 206 is then invoked on a live game streaming session between the streaming servers 118, the cloud services 130 and the client devices 222A, 122A, 122B and the generation decoding fuzzing engine 207 automatically generates a protocol template 204A that includes the fuzz testing primitives, packet ordering and state information. The generation fuzz testing module 204 receives the generated protocol template 204A and uses the generation fuzzing engine 205 to produce generation-based fuzzed inputs for fuzz testing of the streaming server 118, the cloud services 130 and the client devices 222A, 122A, 122B.

When the network protocol changes or a new version of the network protocol is released, minor changes can be made to the generation decoding library 206 to accommodate the changes in the new network protocol and a new protocol template 204A can be automatically generated for new fuzz tests.

There are two instances for the generation of a new protocol template, both instances occur based on the need to change the communication protocol being tested. A first instance occurs when there is a protocol change that does not change the protocol definition. The protocol definition includes the building blocks of how the messages will be put together. In one implementation, in the game stream protocol, the basic message structure is a TakionMessage. Each TakionMessage has a header and one or more payloads. Example payloads include an Init, an InitAck, a CookieEcho, and data payloads. Each of these payloads also has a definition. For example, the InitAck can includes fields similar to:
Endpoint tag
Endpoint window buffer size
Initial transmission sequence number In the first instance, the protocol changes in a way that does not alter the protocol definition or the syntax of each packet, data payload, etc. By way of example, an initial packet of the streaming protocol can include a streaming protocol header and an Init payload. When the protocol is changed, the initial packet includes the streaming protocol header, an Init payload and also includes a newly added data payload. The decoding library already knows how to process and identify and decode the data payload. Therefore, no changes are needed to capture the new protocol.

A second instance of a protocol change occurs when the protocol change requires a protocol definition change. Using an example similar to above, an InitAck payload, an example protocol definition change is when the new payload definition becomes:
  Endpoint tag
  Endpoint window buffer size
  Initial transmission sequence number
  Protocol flags The addition of the "protocol flags" value means that all of the software that is used to parse the protocol needs to be updated. This includes the decoding library. In this instance, an update would be provided to the decoding library such that the code that manages the decoding of the InitAck payload would include the new Protocol Flags primitive. After the decoding library is updated, the same procedure to generate a new protocol template would be used.

In one implementation, capturing a new protocol template in either the first instance or the second instance includes: executing the fuzz testing client API 201A on the Host Test Bench System such as invoking with a command-line argument indicating that the "capture" test case should be run. The fuzz testing client API 201A interfaces with the Game Stream Interceptor (e.g., via the Web Interface) to initiate the capture mode, passing along the name of the new protocol template file. fuzz testing client API 201A interfaces with the Cloud Services/Slot Authorization API 251 to generate a launch configuration for the streaming client device. The streaming client device is then invoked with this configuration. The streaming client device performs the new protocol handshake with the Streaming Server, of which all of the packets are intercepted and captured by the Game Stream Interceptor. The Fuzz Client CLI stops after the handshake is complete. The new protocol template can be saved in the specified protocol template file.

The fuzz testing client 202 includes the generation fuzz testing module 204 and the generation decoding library 206. A generation fuzz engine 205 is included in the generation fuzz testing module 204. The generation fuzz testing modules 204 uses the corresponding generation fuzzing engine 205 that provides state management for the protocol states as well as the fuzzing states for fuzz testing each of the blocks and primitives in the protocol. The generation fuzz engine 205 provides definitions of the fuzzing primitives and fuzzing state logic.

In one implementation, the fuzz testing server API 252 is used to determine whether or not the streaming server is still operational and is used by the fuzz test client to determine if the fuzz test cases pass or fail. The fuzz testing server API 252 provides a simple server status indication on whether or not the server is still in an operational state. In one implementation, the fuzz testing client 202 and the game stream interceptor 212 communicate via int, client API 218 and int. web API 219.

The mutation based fuzz testing techniques include providing a middle agent to capable of intercepting game session packets and mutate the intercepted game packets based on specific fuzz testing requirements. The game stream interceptor 212 provides the middle agent proxy. Messages in both directions from the streaming client device 222A or an actual client device 122A,122B and the streaming server 118 are intercepted and processed by the game stream interceptor. Processing can include other fuzz testing modules including the game stream decoding library 216 and mutation fuzz testing module 214. The intercepted and possibly modified packets are then sent on to their original destination, e.g., the streaming client device 222A and/or the streaming server 118. The game stream interceptor 212 is a protocol aware, transparent proxy that can intercept the game play session, modify selected bytes of the protocol and pass the modified packets on to the original destination, thus providing fuzz testing capabilities for both the client device 222A and hosting servers 118.

In one implementation, the game stream interceptor 212 provides the capability to capture/decode the game stream and generate the protocol template and provides mutation-based fuzzing capabilities. Client packets from the original session are broken into primitives, e.g., strings, integers, booleans, etc., and groupings thereof. Each primitive type within the fuzzing engine includes a definition of the permutation list, or the list of values that the mutation fuzz testing module will try for that primitive type. The lists are automatically generated and/or maintained within the fuzzing engine implementation. For example, a 32-bit integer has roughly 140 values that will be used in generation-based fuzzing. A string has roughly 1000 values. Each primitive is mutated based on lists of potentially bad data sets. The result is thousands of sessions, each with small mutations in the protocol.

In another implementation, the game stream interceptor 212 intercepts one or more packets from data stream between the streaming server 118 and the client device 222A. In one implementation, the game stream interceptor 212 can then utilize the game stream decoding library 216 and the mutation fuzz testing module 214 to modify the intercepted packets by injecting IP table rules into a Linux host using the NFQUEUE implementation. In general terms, a Linux system has packet forwarding rules that define what actions to take when processing packets coming in and out of a system. The packet forwarding rules are commonly referred to as IPtables. The NFQUEUE is the NetFilter Queue and is part of the broader IPtables implementation and defines a capability to forward packets from the IPtables input and output rule processing to listening user-space processes. It should be understood that using the clinics host and the NFQUEUE implementation is merely an exemplary implementation and other similar packet forwarding processes could similarly be used with similar effect. The game stream interceptor 212 then sends the modified packets onto their original destination, e.g., the streaming client device 222A. It should be understood that the game stream interceptor 212 can intercept packets from a data stream originating from the streaming client device 222A or an actual client device 122A, 122B, modify the intercepted packets and forward modified packets to the streaming server 118. Alternatively and/or additionally, the game stream interceptor 212 can intercept packets from a data stream originating from the streaming server 118, modify the intercepted packets and forward modified packets to the streaming client device 222A or an actual client device 122A, 122B.

The game stream decoding library 216 parses and re-encodes protocol messages intercepted by the game stream interceptor from the communications in both directions between the streaming client device 222A and the streaming server 118. The protocol messages are broken into a set of building blocks and primitives e.g., strings, integers, booleans, etc., and groupings thereof, which can be individually accessed, modified or used by the mutation fuzz testing module 214 for mutation. The game stream decoding library 216 includes the game stream decoding fuzzing engine 217. The game stream decoding library 216 decodes protocol messages and breaks the protocol messages into fuzzing primitives. The fuzzing primitives are defined in the game stream decoding fuzzing engine 217. The mutation fuzz testing module 214 provides the logic on how to mutate intercepted packets, defining rules on what parts of the packets are mutated and how those mutations are performed.

The mutation fuzz testing module 214 provides a variety of test cases for both the streaming client device 222A and streaming server 118. The mutation fuzz testing module 214 also provides packet mutation functions for the game stream interceptor 212.

Figure 3:
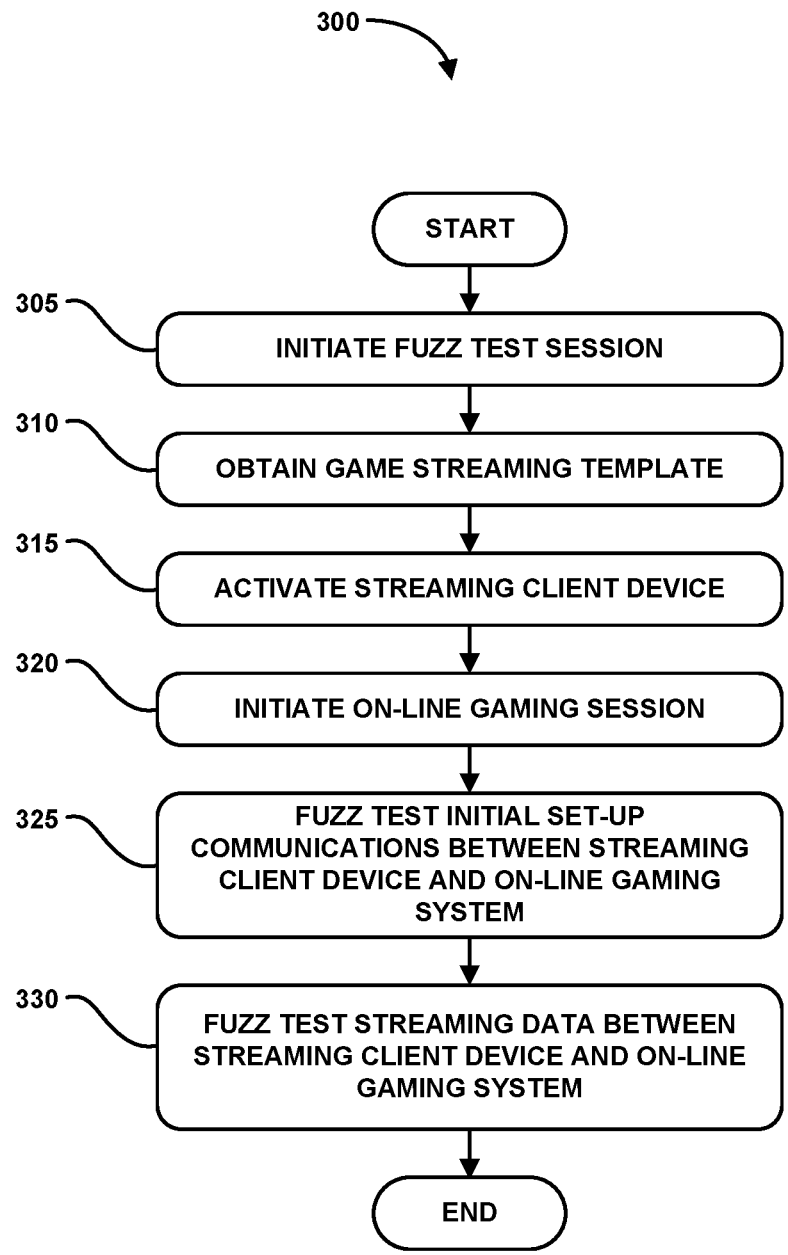
FIG. 3 is a flowchart diagram that illustrates an overview the method operations performed by the fuzz testing system, for implementing embodiments of the present disclosure.

FIG. 3 is a flowchart diagram that illustrates an overview the method operations 300 performed by the fuzz testing system 200, for implementing embodiments of the present disclosure. The operations illustrated herein are by way of example, as it should be understood that some operations may have sub-operations and in other instances, certain operations described herein may not be included in the illustrated operations. With this in mind, the method and operations 300 will now be described.

In an operation 305, the fuzz test session is initiated using the fuzz testing client 202. The fuzz testing client 202 seeks out and obtains a game stream template in an operation 310. Obtaining the game stream template can include one or more of several operations. In one implementation, the game stream template can be manually generated. Alternatively, the game stream template can be retrieved from a previous record such as previous fuzz test session or other external source.

In an operation 315, the streaming client device 222A can in instantiated. In an operation 320, an on-line gaming session is initiated by the fuzz testing client 202. In an operation 325, the initial set-up communications between the streaming client device 222A and/or other client devices 122A, 122B and the on-line gaming system (e.g., the cloud services, hosting server 114 and the streaming server 118) is fuzz tested using the generation fuzz testing module 204 of the fuzz testing client 202 using the initial set-up communications as the generation fuzz test data to be tested by the generation fuzz testing module. In one implementation, the fuzz testing client 202 activates the streaming client device 222A and the streaming client device communicates with the cloud services 130 portion of the on-line gaming system via a corresponding fuzz testing server application programming interface 252.

In an operation, 330, the streaming communications between the streaming client device 222A and the streaming server 118 is tested using mutation fuzz testing. In the mutation fuzz testing, the game stream interceptor 212 intercepts streaming data between one of the client devices 122A, 122B, 222A and the streaming server 118, and the mutation fuzz testing module 214 modifies the data streaming data and then forwards the modified streaming data to the intended recipient of the respective client device and the streaming server.

Figure 4:
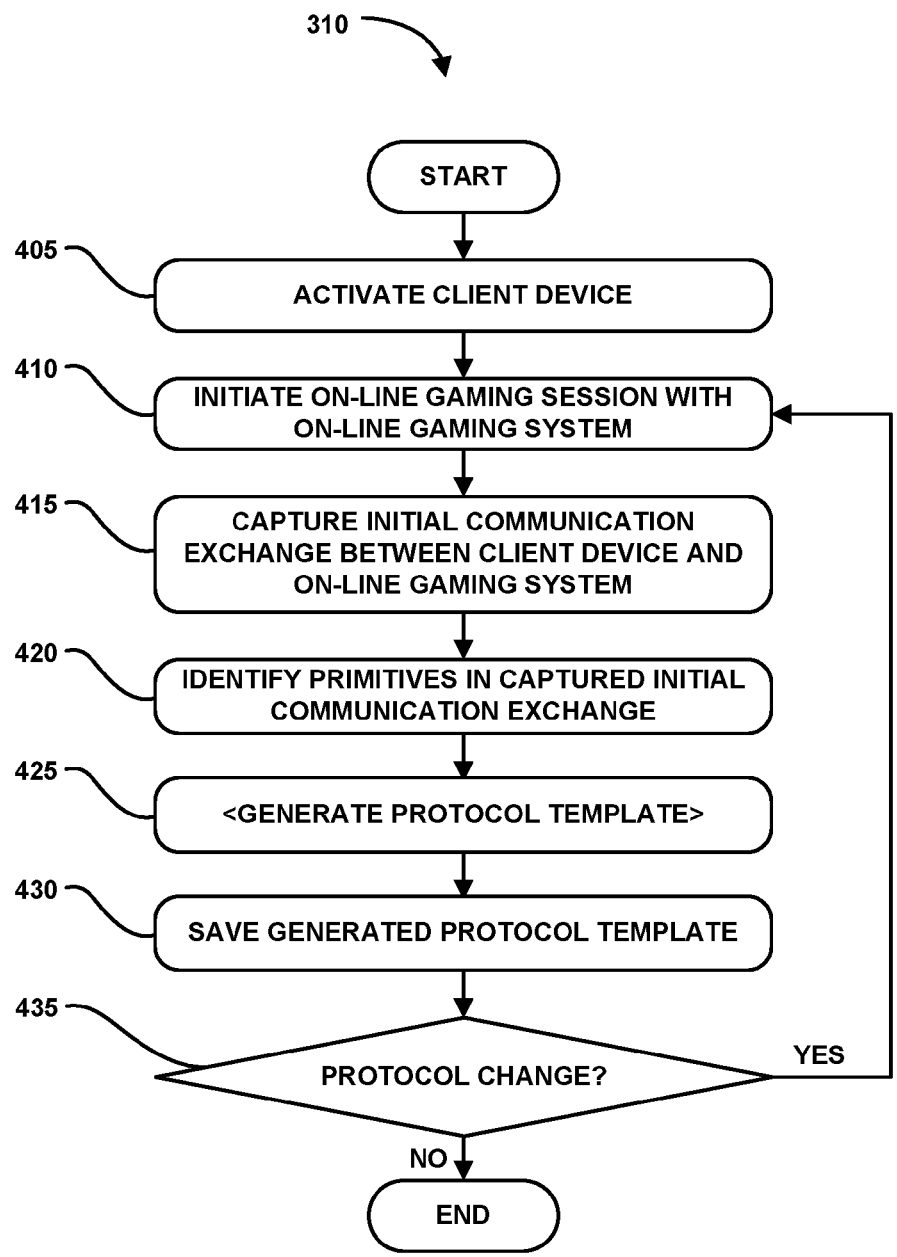
FIG. 4 is a flowchart diagram that illustrates an overview the method operations 310 performed by the fuzz testing system when automatically generating the protocol template, for implementing embodiments of the present disclosure.

FIG. 4 is a flowchart diagram that illustrates an overview the method operations 310 performed by the fuzz testing system 200 when automatically generating the protocol template 204A, for implementing embodiments of the present disclosure. The operations illustrated herein are by way of example, as it should be understood that some operations may have sub-operations and in other instances, certain operations described herein may not be included in the illustrated operations. With this in mind, the method and operations 310 will now be described As discussed above, the protocol template 204A can be generated automatically. Automatically generating the protocol template 204A is especially useful when the network protocol is updated. The network protocol may be updated for various reasons for example a security feature can be added to the network protocol or one or more fields can be added to or removed from the network protocol definition. The network protocol can include changes to the handshake communications between the client device and on-line gaming system. Network protocol changes and deployments to the field can occur relatively often and as a result the test of the changed network protocol using the fuzz test procedures described herein may also need to be performed again to confirm the robustness of the changed network protocol. There may be other reasons why a new protocol template 204A is needed, for example the existing protocol template might be corrupted or lost or otherwise not available for use.

In an operation 405, a client device, such as the streaming client device 222A or one of the client devices 122A, 122B can be activated. When using the host test bench system 201, the streaming client device 222A, can be easily instantiated and used as the client device for generating the protocol template 204A, however any suitable client device can be used, even a client device that is external to the host test bench system 201.

In operation 410, the activated client device 222A, 122A, 122B initiates an online gaming session with the online gaming system. Initiating the online gaming session can include several initiating processes. Each of the initiating processes includes portions of an initial communication exchange between the activated client device and the online gaming system. This initial communication exchange is bi-directional between the activated client device and the online gaming system. This initial handshake exchange can also be between more than one portion of the online gaming system. By way of example, between the activated client device and the cloud services 130, between the cloud services and the hosting server 114, between the hosting server and the activated client device, between the hosting server and the streaming server 118 and between the streaming server and the activated client device.

In an operation 415, the initial communications are passively monitored and captured by the game stream interceptor 212. In an operation 420, the captured initial communications are analyzed to identify the primitives that can be used to generate the network protocol template 204A. In one implementation, the generation decoding library 206 is used to identify the primitives in the captured initial communications. By way of example, strings, integers, booleans, etc., and groupings thereof present in the captured initial communications that correspond to primitives that can be modified for test purposes can be identified.

In an operation 425, the protocol template 204A is generated and then saved or stored in an operation 430. Once the protocol template 204A is available, then the method operations, as described in FIG. 3 above, can continue. For each protocol message information is gathered. This information can include a tag indicating the type of protocol message, a quantity of raw, unmodified message data and a state information associated with the message, including source/destination addresses/ports and timestamp information. This data is collected, serialized, then written to the protocol template file.

However, when the network protocol changes as identified in an operation 435, then a new protocol template 204A is needed and the method operations continue in operation 410 as described above. If the network protocol never changes, then the method operations, as described in FIG. 4, can end.

Once the protocol template 204A is available, the initial communications between the client device(s) and the online gaming system can be tested. As discussed above, initial communications between the client device online gaming systems are tested using a generation fuzz test system implemented by the fuzz testing client 202. Generation fuzz testing includes testing the streaming protocol module 231 in the streaming server 118. The generation fuzz testing tests the ability of the streaming protocol module 231 to process the initial protocol handshake that is normally expected between the client device 222A, 122A, 122B and the streaming server 118. The handshake sets up the communication channel between the client device and streaming server. The handshake includes protocol specific actions that occur, including authentication and authorization, setting up initial data sequence numbers, reporting status, etc.

Figure 5:
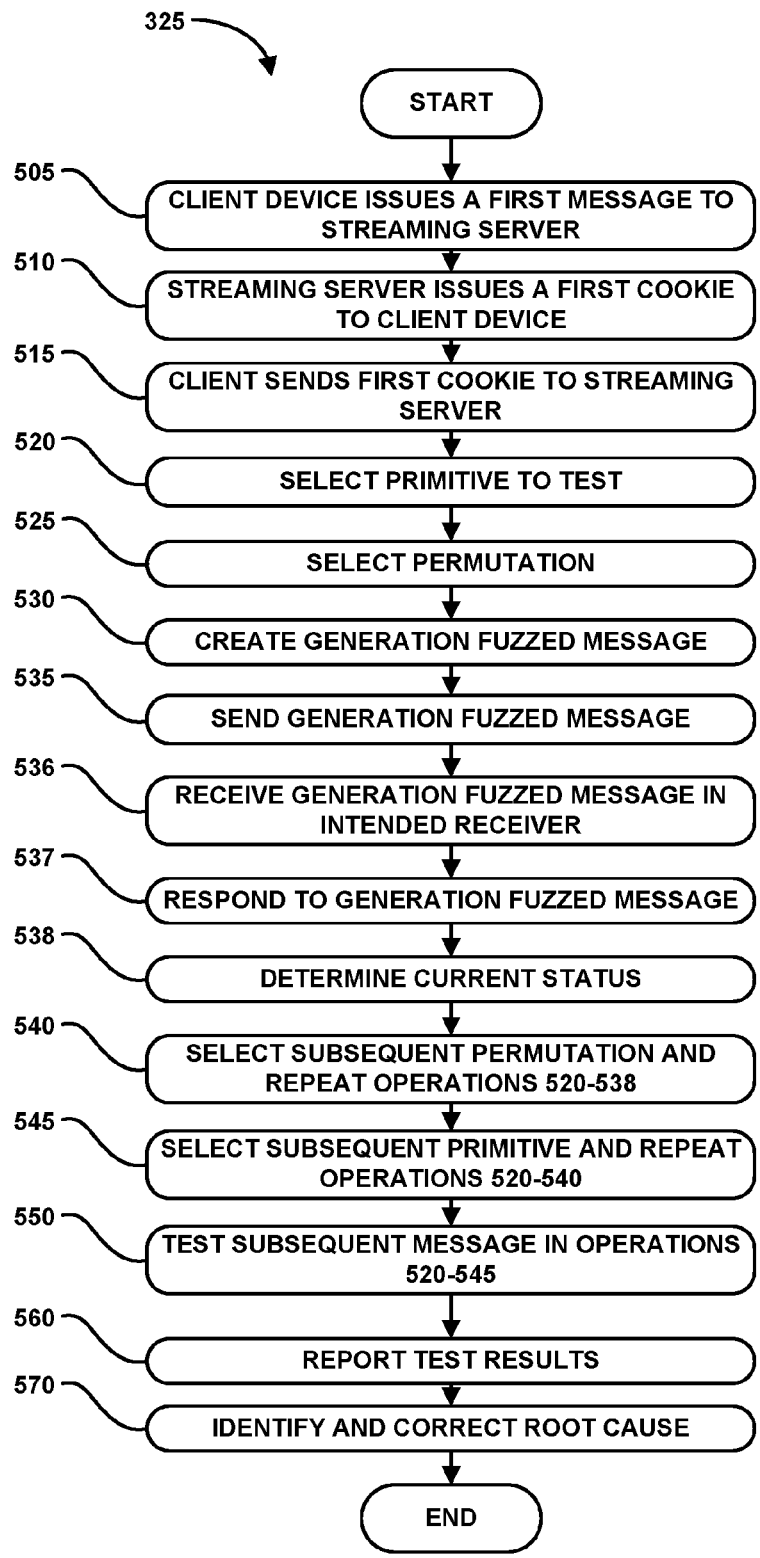
FIG. 5 is a flowchart diagram that illustrates an overview the method operations performed by the fuzz testing system for testing the initial set up communications using generation fuzz testing techniques, for implementing embodiments of the present disclosure.

FIG. 5 is a flowchart diagram that illustrates an overview the method operations 325 performed by the fuzz testing system 200 for testing the initial set up communications using generation fuzz testing techniques, for implementing embodiments of the present disclosure. The operations illustrated herein are by way of example, as it should be understood that some operations may have sub-operations and in other instances, certain operations described herein may not be included in the illustrated operations. With this in mind, the method and operations 325 will now be described.

In an operation 505, the client device 222A, 122A, 122B issues a first message to the streaming server 118. The first message is an initialization message for the streaming protocol. The following is an exemplary first message expressed in hexadecimal notation, as captured from the streaming client device 222A to the streaming server 118 connection:

6403000000000000030390000

The following Table 1 provides an example of how the first message can be translated into a corresponding protocol template 204A. The data from the first message is filled into protocol template 204A, byte-by-byte, starting left-to-right.

TABLE 1

| Tag | Primitive Type | Original Value |
|---|---|---|
| msg | BlockStart | |
| msg.msgType | Byte | 100 (Handshake) |
| msg.handshake | BlockStart | |
| msg.handshake.header | BlockStart | |
| msg.handshake.header.version | Byte | 3 |
| msg.handshake.header.tag | Integer | 0 |
| msg.handshake.header | BlockEnd | |
| msg.handshake.data.init | BlockStart | |
| msg.handshake.data.init.initTag | Integer | 12345 |
| msg.handshake.data.init.flags | Short | 0 |
| msg.handshake.data.init | BlockEnd | |
| msg.handshake.data | BlockEnd | |
| msg.handshake | BlockEnd | |

In an operation 510, the streaming server 118 issues a second message to the client device. The second message includes a first cookie.

In an operation 515, the client device 222A, 122A, 122B responds to the first cookie by sending the first cookie back to the streaming server 118. The exchange of the first cookie is performed to validate that the client device is actively communicating with the streaming server and listening to the streaming server's response. This establishes the communications link over the various networks 208A, 208B, and/or the Internet 102 are functional so that the client device and the streaming server can communicate and data can begin streaming between the client device and the streaming server. A portion of the streaming data between the streaming server and the client device is captured as a captured portion of the streaming data and the captured portion of the streaming data can be mutation fuzz tested.

In an operation 520, the generation fuzzing engine 205 reads the protocol template 204A and starts iterating through the primitives. The first primitive in the protocol template is the "msg.msgType". This is a byte primitive representing the type of message. On one implementation, the order of primitive selection is the same as the order the primitives occur in the original message. By way of example, msg.msgType is the first primitive that has a value, therefore msg.msgType is the first primitive that would be mutated, in the above example. Continuing with the example, msg.handshake.header.version would be the second primitive to be mutated. In one implementation, the selection criteria for which permutation to use is ordered and determined by a list of permutations defined in the fuzzing library. The permutation used will vary based on the type of primitive. In one implementation, the list of permutations includes about 140 permutations for integers and over a 1000 permutations for strings. In one implementation, the permutations can be selected to cause abnormal behavior. By way of example, selected permutations can focus on boundary conditions based on primitive length, or other aspects of the primitive.

In operation 525, the generation fuzzing engine 205 defines permutations of primitives based on primitive type. For a byte type, generation fuzzing engine 205 selects values which might trigger boundary conditions in the software and hardware being tested, including 0, 1, 2, 254, 255, etc. By way of example, if the generation fuzzing engine 205 iterates and picks "254" as the permutation. Using the protocol template 204A, the generation fuzzing engine 205 will create the following fuzzed message, in an operation 530:

Fe03000000000000030390000 Note that the first byte of the fuzzed message is modified, replacing the original "00"

with "fe" (hexadecimal for 254). In an operation 535, the fuzzed message is sent to the streaming server 118.

In an operation 536, the fuzzed message is received by the streaming server 118. In an operation 537, the streaming server 118 response to the fuzzed message is captured. The generation fuzz testing detects streaming server protocol module 231 parsing errors that will result in instability of the on-line gaming service.

By way of example, a server status check is issued by the fuzz testing client 202 through the fuzz testing server API 252 to the streaming server 118. The status check confirms the current state of the streaming server 118. The current fuzz testing message returns a status of a pass when the current state of the streaming server 118 is "available" as there was no problem for the streaming server to process the current generation fuzzed message. Alternatively, the status may be a fail if the current state of the streaming server 118 indicates that the streaming server crashed receiving or attempting to process the current generation fuzzed message.

In an operation 538, the current status of the streaming server 118 and the current generation fuzzed message corresponding to the current status, e.g., pass/fail, can be stored for future reference and analysis in a generation fuzz testing results database. In addition to the current status of the current generation fuzzed message, other test information including a timestamp or other indicator identifying when the specific current generation fuzzed message test was executed and a duration indication indicating how long the current generation fuzzed message test required to be completed.

In an operation 540, the generation fuzzing engine 205, continues in an iterative fashion selecting a subsequent permutation for the first primitive and issuing the subsequently fuzzed message, repeating until all permutations for that primitive are exhausted in operations 520 through 538.

In an operation 545, the generation fuzzing engine 205 selects the next primitive and repeats operations 520 through 540 until all primitives of the message have been fuzzed and issued.

In an operation 550, a subsequent message is received and iteratively fuzzed as described above in operations 520 through 545 until all messages have been generation fuzz tested.

In an operation 560, the results of the generation fuzz testing results database can be reported to one or more users or a test automation framework to identify vulnerabilities and errors in the online gaming system. In an operation 565, a generation fuzz testing failure analyzed to identify a root cause.

In an operation 570, the identified root cause is corrected. By way of example, if a streaming server software change was made and was the initiator for the generation fuzz testing, and the generation fuzz testing have exposed a vulnerability, e.g., a failure, the streaming server software may be reported for correction such as a new software patch or other revisions to the streaming server software as may be necessary to correct the identified vulnerability.

Note that the initial set up an initial communications and data exchange between the client device and the streaming server are analyzed in the generation fuzz testing process. However these initial communications are only the beginning of an on-line gaming session between the client device and the streaming server. The remaining communications during the on-line gaming session include the actual streaming for receiving the gaming content and mid-game communications for controlling the game. This portion of the communications between the client device and the streaming server are processed using the game stream interceptor 212 in a mutation fuzz testing process.

Figure 6:
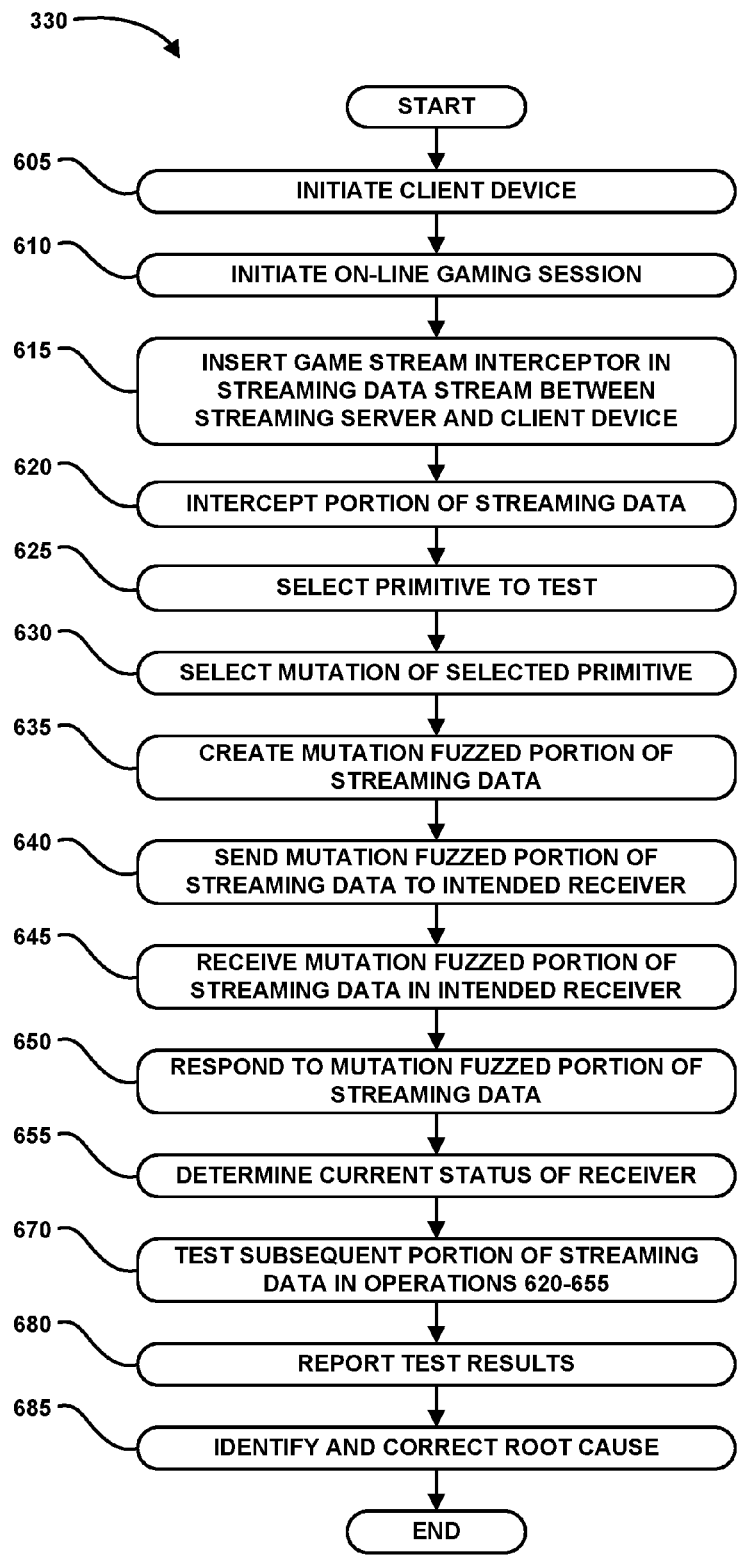
FIG. 6 is a flowchart diagram that illustrates an overview the method operations performed by the fuzz testing system for conducting the mutation fuzz testing process using the game stream interceptor, for implementing embodiments of the present disclosure.

FIG. 6 is a flowchart diagram that illustrates an overview the method operations 330 performed by the fuzz testing system 200 for conducting the mutation fuzz testing process using the game stream interceptor 212, for implementing embodiments of the present disclosure. The operations illustrated herein are by way of example, as it should be understood that some operations may have sub-operations and in other instances, certain operations described herein may not be included in the illustrated operations. With this in mind, the method and operations 330 will now be described.

Mutation based fuzz testing identifies a mutation algorithm and a fuzzing percentage. The fuzzing percentage represents the percent of the matching packets that will be mutated. The game stream protocol is very resilient, however, at some point the game stream protocol will fail if too many mutated packets are received. This indicates a protocol failure and not a component failure. Once the client device to streaming server game stream has been established, the game stream interceptor receives all of the traffic flowing between the client device and the streaming server. The mutation algorithm is evaluated against each protocol message flowing through the game stream interceptor. If the mutation algorithm conditions are met, a random number [1-100] is selected to compare against the fuzzing percentage. Mutation algorithm conditions can vary from test to test, but can include one or more of the following conditions:
  only fuzz client to streaming server messages
  only streaming server to client device messages
  only fuzz audio messages
  only fuzz video messages
  etc.

If the random number is less than the fuzzing percentage, the packet will be mutated based on the mutation algorithm. The mutation algorithm may again be one or more of many different mutations:
  mutate a specific byte in the message
  randomly mutate the message e.g., adding, removing or changing bites from the original message
  randomly mutate a specific protocol primitive e.g., fuzz the msg.type primitive The mutation fuzz testing module 214 determines the mutation, based on the test case.

Mutation fuzz testing operates on a somewhat similar process to the generation-based fuzz testing described in FIG. 5, above. Mutation fuzz testing acts on and existing data stream between the client devices 222A, 122A, 122B and the streaming server 118. In an operation 605, the mutation fuzz testing is initiated by the fuzz testing client 202. Initiating the mutation fuzz testing can include initiating the streaming client device 222A, if the streaming client device is not already initiated and the streaming client device is the client being tested in the current test process. As noted above an actual user's client device 122A, 122B can also be tested in the mutation fuzz testing process. An on-line gaming session is initiated by and between the client device and the on-line gaming system in an operation 610. Establishing the on-line gaming session also includes establishing a bi-directional streaming data session between the client device and the streaming server 118.

In operation 615, the game stream interceptor 212 is initiated. Initiating the game stream interceptor 212 logically inserts the game stream interceptor between the client device and the streaming server 118 so that the streaming data flowing in both directions between the client device and the streaming server 118 passes through the game stream interceptor.

In an operation 620, the game stream interceptor 212 intercepts a portion of streaming data e.g., a message, originating from one of the client device or the streaming server. The intercepted message can include any selected number of data packets of streaming data. The number of data packets selected from the streaming data is limited only by the processing capability of the host test bench system 201.

In an operation 625, the first captured message is analyzed to identify the corresponding primitives included in the first captured message.

In an operation 630, the mutation fuzz testing module 214 selects a primitive to test using mutation fuzz testing.

The mutation fuzz testing module 214 will test the captured message to determine if the captured message is to be mutated and if the captured message is to be mutated the mutation fuzz testing module will create a mutated captured message, in an operation 635.

In an operation 640, the mutated captured message is sent to the originally intended receiver. If the captured message was sent by the streaming server to the client device, then the mutated message will be forwarded to the client device by the game stream interceptor 212. Alternatively, if the captured message was sent by the client device to the streaming server, then the mutated captured message will be forwarded to the streaming server by the game stream interceptor 212.

In an operation 645, the mutated captured message is received by the intended receiver e.g., the client device or the streaming server, respectively. In an operation 650, the intended receiver response to the mutated captured streaming data is captured by querying the intended receiver using respectively the streaming client application programming interface (API) 241 or the fuzz testing server API 252 to determine the current status of the client device, or streaming server, respectively. The mutation fuzz testing detects vulnerabilities using the streaming server protocol module 231 and the client device that could result in instability of the on-line gaming service.

By way of example, a client device status check is issued by the fuzz testing client 205B through the streaming client API 241 to the streaming client device 222A. The status check confirms the current state of the streaming client device 222A. The streaming client API 241 can also be used to check the status of an external client device such as client devices 122A, 122B. The current mutated captured streaming data response returns a status of a pass when the current state of the client device is "available" as there was no problem for the client device to process the current mutated captured streaming data. Alternatively, the status may be a fail if the current state of the client device indicates that the client device crashed receiving or attempting to process the current mutated captured streaming data or otherwise indicates a failure to process the received, mutated captured streaming data.

In an operation 655, the current status of the client device and the current mutated captured streaming data corresponding to the current status, e.g., pass/fail, can be stored for future reference and analysis in a mutation fuzz testing results database 252B. In addition to the current status of the current mutated captured streaming data, other test information including a timestamp or other indicator identifying when the specific current mutated captured streaming data test was executed and a duration indication indicating how long the current mutated captured streaming data test required to be completed.

In an operation 670, a subsequent message from the streaming data is captured by the game stream interceptor and mutation fuzz tested as described above in operations 620 through 665 until all of the captured streaming data that is desired to be tested has been mutation fuzz tested.

In an operation 680, the results of the mutation fuzz testing results database 252B can be reported to one or more users or a test automation framework to identify vulnerabilities and errors in the on-line gaming system. In an operation 685, a mutation fuzz testing failure of the streaming data is analyzed to identify a root cause and the identified root cause is corrected. By way of example, if a streaming server software change was made and was the initiator for the mutation fuzz testing, and the mutation fuzz testing have exposed a vulnerability, e.g., a failure, the streaming server software may be reported for correction such as a new software patch or other revisions to the streaming server software as may be necessary to correct the identified vulnerability.

The following is an example a mutation fuzz testing process. The mutation fuzz testing is dependent on a mutation algorithm and a fuzzing percentage. The mutation algorithm parameters and the fuzzing percentage include streaming data that is being sent by the streaming server to the client device, and, for the purposes of this example, the fuzz testing is limited to only video messages, and further, for purposes of this example, the fuzz testing will be limited to only specific fields. These fuzz testing parameters could be specified as the following fuzz mutation parameters:

mutation algorithm conditions: msg.msgType=video and direction(msg)–client mutation algorithm mutation: Mutate the msg.video.seqNo" value by randomly selecting a new value mutation percentage: 5%

When evaluating the following three example packets:

Server->client: msg101: audio
Server->client: msg102: video
Server->client: msg103: video Streaming Server sends msg101 to client device. msg101 has the following hexadecimal representation:

65271100650b0a0a0a0a0a0a0a0a0a0a0a0a0a0a0a0a0a0a 0a0a0a0a0a0a0a

Game stream interceptor intercepts msg101 and utilizes the game stream decoding library to break the message into primitives, as shown in Table 2:

TABLE 2

| Tag | Primitive Type | Original Value |
|---|---|---|
| msg | BlockStart | |
| msg.msgType | Byte | 101 (Audio) |
| msg.audio | BlockStart | |
| msg.audio.seqNo | Short | 10001 |
| msg.audio.frameNo | Short | 101 |
| msg.audio.codec | Byte | 11 |
| msg.audio.audioData | String | 0a0a0a0a0a0a0a0a0a0a0a0a0a0a0a0a 0a0a0a0a0a0a0a0a |

The game stream interceptor uses the mutation fuzz testing module to determine if this packet (msg101) should be mutated. The rules for the specific test case are evaluated. The first rule is evaluated. The msg.msgType of the actual message (Audio) is compared against the rule "msg.msgType==video". This comparison fails indicating that the msg101 should not be mutated.

As the test indicates the msg101 should not be mutated, the game stream interceptor forwards the original, unmutated msg101 to the client device as the client device was originally intended recipient when the message was sent by the streaming server. The client device receives the original, unmutated msg101 and processes the received message in a normal fashion.

The streaming server sends the next message, msg102, having the following hexadecimal representation:

664e2100c9150b0b0b0b0b0b0b0b0b0b0b0b0b0b0b0b0b0b0b0b0b0b0b0b

The game stream interceptor intercepts the msg102 and uses the game stream decoding library to break the message into primitives as shown in Table 3:

TABLE 3

| Tag | Primitive Type | Original Value |
|---|---|---|
| msg | BlockStart | |
| msg.msgType | Byte | 102(Video) |
| msg.video | BlockStart | |
| msg.video.seqNo | Short | 20001 |
| msg.video.frameNo | Short | 201 |
| msg.video.codec | Byte | 21 |
| msg.video.audioData | String | 0b0b0b0b0b0b0b0b0b0b0b0b0b0b0b0b0b0b0b0b0b0b0b0b |
| msg.video | BlockEnd | |
| msg | BlockEnd | |

The game stream interceptor uses the mutation fuzz testing module to determine if this msg102 should be mutated. The rules for the specific test case are evaluated. The first rule is evaluated. The msg.msgType of the actual message (Video) is compared against the rule "msg.msgType==video". This comparison succeeds indicating that the msg102 should be mutated.

Next the second rule is evaluated: direction(msg)==client. This rule also succeeds as the message was sent from the streaming server to the client device. As both the first rule and the second rule were both satisfied, then msg102 is submitted for mutation fuzz testing.

The mutation fuzz testing module performs a random percentage check. A random number between 1 and 100 is selected. In this example, the random number selected is 50. The random percentage selected for this test case is 5, so the random percentage check fails, meaning that this msg102 will not be mutated.

As the random percentage check fails and indicates the msg1021 should not be mutated, the game stream interceptor forwards the original, unmutated msg102 to the client device as the client device was originally intended recipient when the message was sent by the streaming server. The client device receives the original, unmutated msg102 and processes the received message in a normal fashion.

The streaming server sends the next message, msg103, having the following hexadecimal representation:

664e2100ca150c0c0c0c0c0c0c0c0c0c0c0c0c0c0c0c0c0c0c0c0c0c0c0c

The game stream interceptor intercepts the msg103 and uses the game stream decoding library to break the message into primitives as shown in Table 4:

TABLE 4

| Tag | Primitive Type | Original Value |
|---|---|---|
| msg | BlockStart | |
| msg.msgType | Byte | 102 (Video) |
| msg.video | BlockStart | |
| msg.video.seqNo | Short | 20001 |
| msg.video.frameNo | Short | 201 |
| msg.video.codec | Byte | 21 |
| msg.video.audioData | String | 0c0c0c0c0c0c0c0c0c0c0c0c0c0c0c0c0c0c0c0c0c0c0c0c |
| msg.video | BlockEnd | |
| msg | BlockEnd | |

The game stream interceptor uses the mutation fuzz testing module to determine if this msg103 should be mutated. The rules for the specific test case are evaluated. The first rule is evaluated. The msg.msgType of the actual message (Video) is compared against the rule "msg.msgType==video". This comparison succeeds indicating that the msg103 should be mutated.

Next the second rule is evaluated: direction(msg)==client. This rule also succeeds as the message was sent from the streaming server to the client device. As both the first rule and the second rule were both satisfied, then msg103 is submitted for mutation fuzz testing.

The mutation fuzz testing module performs a random percentage check. A random number between 1 and 100 is selected. In this example, the random number selected is 3. The random percentage selected for this test case is 5, so the random percentage check succeeds, meaning that this msg103 will be mutated.

The mutation fuzz testing module mutates msg103 based on the mutation rule for this specific test case. For this example, the field "msg.video.seqNo" is to be randomly mutated. The msg.video.seqNo is a Short primitive, so a new random short value will be selected. For this example, new random short value is 52757. The original msg103 is mutated and becomes:

66ce1500ca150c0c0c0c0c0c0c0c0c0c0c0c0c0c0c0c0c0c0c0c0c0c0c0c (emphasis added to highlight the mutation)

The game stream interceptor forwards this mutated msg103 to the client device as the client device was the originally intended receiver of msg103.

The client device receives the mutated msg103 and processes the received, mutated msg103. Under normal instances, the client device performs a data validation on the received messages, such that an unexpected value would cause an erroneous message to be dropped and that the client device would continue the game streaming without interruption. The fuzz testing client 202 determines that the client device is still operational using the status client API 241. If the client device is still operational, then the mutation of msg103 did not interrupt the operations of the client device, thus indicating the client device is robust enough to tolerate this amount of data error in the received messages. Alternatively, if the client device is no longer operational as indicated by the client status data returned by the status client API 241, this indicates the client device is not robust enough to tolerate this amount of data error in the received messages. In both instances the status of the client device after receiving the mutated msg103 is recorded in a fuzz testing database along with the mutated msg103 so that additional testing and failure analysis can be performed to identify root cause of the failed client device.

Mutation fuzz testing can modify bytes of an existing data flow. For game play mutation fuzz testing, this means modifying an active client/server streaming session as the session is occurring. In contrast, generation fuzz testing uses data modelling and knowledge of the protocol to generate new test data. The generation fuzzing engine is "generating" the inputs from scratch based on the protocol specification or format. Random fuzz testing can be accomplished with generation fuzz testing or mutation fuzz testing and uses random functions to blindly modify or mutate random bytes of the existing data stream. Protocol-based fuzz testing utilizes protocol knowledge to either target areas of concern or programmatically traverse the possible fuzzing permutations or a protocol this technique can be used by both mutation fuzz testing and generation fuzz testing. Server protocol generation testing uses generation based, intelligent fuzz testing using a detailed protocol of the streaming protocol module 231 for testing the streaming protocol module and identifying vulnerabilities of the streaming server 118. This can be used for initial handshake with the streaming server or the streaming protocol module 231. Streaming server protocol mutation testing can use mutation based on both intelligent and random techniques to ensure that the streaming server is properly handled and tested by the fuzz testing processes described herein. Client protocol mutation testing can use both intelligent and random techniques for testing the vulnerabilities and capabilities of the client devices potentially capturing stability issues such as failures and decryption or authentication handling and the A/V decoder and other potential protocol issues. Streaming server-based test can include test cases for all supported versions of the streaming protocol module 231. As described above, as new versions of various components software and hardware are issued they can be fuzz tested. It should be understood that the host test bench system 201 was described above is a Linux based computing platform e.g., personal computer, tablet, server, handheld computing device using any suitable operating system, however it should also be understood that this could apply to any type of computing platforms including specialized gaming machines such as hardware gaming consoles and virtualized gaming consoles.

As described above both the generation fuzz testing module 204 and the mutation fuzz testing module 214 include corresponding fuzzing engine 205. The fuzzing engine 205 provide state management for the protocol states as well as mutation states for fuzzing each of the holding blocks and primitives in the protocol.

The generation fuzz testing module can receive a decoded game stream from the game stream interceptor and interface with the generation fuzzing engine 205 and generation decoding library to generate new protocol sessions with the streaming server. Each client packet of the original session can be broken into primitives. Each primitive can then be mutated based on lists of potentially bad data sets as defined in the protocol template 204A. The result is thousands of sessions each with small mutations in the protocol.

The mutation fuzz testing module 214 provides a variety of test cases for both client device and streaming server and provides packet mutation functions for the game stream interceptor 212. The mutation functions will include random mutations as well as targeted tests as may be identified as likely vulnerabilities or errors e.g., mutating encryption key position fields or other vulnerable fields.

The fuzz testing client 202 access the front end for the fuzz testing. The fuzz testing client 202 interfaces with cloud or core components of the online gaming system to acquire proper PSN credentials and a server lock before starting a generation fuzz testing session. The fuzz testing client 202 is also responsible for starting the client device and interfacing with the game stream interceptor to set up each test case in the mutation fuzz testing processes.

With the above embodiments in mind, it should be understood that the disclosure may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the disclosure are useful machine operations. The disclosure also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present disclosure can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Any of the operations described herein that form part of the disclosure are useful machine operations. The disclosure also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The disclosure can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the disclosure. Further, the processes described in any of the above figures can also be implemented in software stored in any one of or combinations of the RAM, the ROM, or the hard disk drive.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. System for testing an on-line gaming system comprising:
   the on-line gaming system includes a storage server;
   a host test bench system, including:
   a fuzz testing client for automating a session of said testing of the on-line gaming system;
   a generation decoding library configured for identifying primitives that are descriptive of a current protocol used for the session of said testing;
   a generation fuzz testing module operable to generate generation fuzz test data for the on-line gaming system for said current protocol using a protocol template constructed from said primitives identified using the generation decoding library;
   a game stream interceptor for intercepting game session packets for a data stream during said session;
   a mutation fuzz testing module operable to generate mutation fuzz test data for the on-line gaming system from the intercepted game session packets, said generated mutation fuzz data is mutated based on data obtained from a game stream decoding library and a test requirement for said testing; and
   a data communication network coupling the host test bench system to the on-line gaming system via a fuzz testing application programing interface, the game stream interceptor intercepts said game session packets from data communications between the on-line gaming system and a streaming client device of the host test bench system;
   wherein a change in said current protocol to another protocol causes the generation fuzz testing module to update change automatically the protocol template to another protocol template.

2. The system of claim 1, wherein the streaming client device is a virtual streaming client device instantiated on the host test bench system.

3. A method of testing an on-line gaming system including a storage server, comprising:
   initiating a fuzz testing session on a host test bench system using a fuzz testing client;
   obtaining a protocol template;
   activating a streaming client device;
   initiating an on-line gaming session with the on-line gaming system;
   testing an initial set-up communications between the streaming client device and the on-line gaming system using an generation fuzz testing module included in the host test bench system; and
   testing intercepted streaming data between a streaming client device and the on-line gaming system using a game stream interceptor;
   wherein obtaining the protocol template includes automatically generating the protocol template by capturing an initial communication exchange between the streaming client device and the on-line gaming system to identify a plurality of primitives;
   wherein receiving a change in a network protocol of a network coupling the streaming client device and the on-line gaming system causes reinitiating automatic generation of the protocol template for the change.

4. The method of claim 3, wherein testing the initial set-up communications between the streaming client device and the on-line gaming system using the generation fuzz testing module included in the host test bench system includes:
   capturing an initialization message exchange between the online gaming system and the streaming client device in the game stream interceptor as a captured initialization message;
   selecting a primitive in the captured initialization message as a selected primitive;
   performing a generation fuzz test of the selected primitive;
   determining a current status after performing the generation fuzz test of the selected primitive and saving the current status; and
   analyzing the current status to identify a generation fuzz test failure and a root cause of the generation fuzz test failure.

5. The method of claim 4, further comprising selecting a subsequent primitive in the captured initialization message and performing the generation fuzz test of the subsequent primitive.

6. The method of claim 4, wherein selecting the primitive from the captured initialization message further includes selecting a permutation for the generation fuzz test of the selected primitive.

7. The method of claim 4, wherein determining the current status after performing the generation fuzz test includes requesting a server status via a fuzz testing server application programming interface.

8. The method of claim 4, wherein selecting the primitive in the captured initialization message as the selected primitive includes analyzing the captured initialization message in a generation fuzz testing module including comparing a protocol template to the captured initialization message to identify a plurality of primitives in the captured initialization message, wherein the selected primitive is one of the plurality of primitives in the captured initialization message.

9. The method of claim 3, wherein testing the intercepted data communications between the streaming client device and the on-line gaming system using the game stream interceptor includes:
   inserting the game stream interceptor in a streaming data between the on-line streaming system and the streaming client device;
   capturing a portion of the streaming data between the streaming server and the streaming client device as a captured portion of the streaming data;

selecting a primitive in the captured portion of the streaming data as a selected mutation primitive;

performing a mutation fuzz test of the selected mutation primitive;

determining a current mutation fuzz test status after performing the mutation fuzz test of the selected mutation primitive and saving the current mutation fuzz test status; and analyzing the current mutation fuzz test status to identify a mutation fuzz test failure and a root cause of the mutation fuzz test failure.

10. The method of claim 9, further comprising selecting a subsequent mutation primitive in the captured streaming data and performing the mutation fuzz test of the subsequent mutation primitive.

11. The method of claim 9, wherein selecting the mutation primitive from the captured streaming data further includes selecting a mutation for the mutation fuzz test of the selected mutation primitive.

12. The method of claim 9, wherein determining the current mutation fuzz test status after performing the mutation fuzz test includes requesting a server status via a fuzz testing server application programming interface and requesting a status of the client device via a streaming client application programming interface.

* * * * *